(12) United States Patent
Bal et al.

(10) Patent No.: US 12,210,373 B2
(45) Date of Patent: Jan. 28, 2025

(54) LOW OVERHEAD MESOCHRONOUS DIGITAL INTERFACE

(71) Applicant: STMicroelectronics International N.V., Geneva (CH)

(72) Inventors: Ankur Bal, Greater Noida (IN); Sharad Gupta, New Delhi (IN); Anupam Jain, New Delhi (IN)

(73) Assignee: STMicroelectronics International N.V., Geneva (CH)

( * ) Notice: Subject to any disclaimer, the term of this patent is extended or adjusted under 35 U.S.C. 154(b) by 45 days.

(21) Appl. No.: 18/165,855

(22) Filed: Feb. 7, 2023

(65) Prior Publication Data

US 2023/0259158 A1    Aug. 17, 2023

Related U.S. Application Data

(60) Provisional application No. 63/309,437, filed on Feb. 11, 2022.

(51) Int. Cl.
*G06F 1/12* (2006.01)
*G06F 1/08* (2006.01)
*G06F 1/10* (2006.01)

(52) U.S. Cl.
CPC ............... *G06F 1/12* (2013.01); *G06F 1/08* (2013.01); *G06F 1/10* (2013.01)

(58) Field of Classification Search
CPC ..... G06F 1/12; G06F 1/08; G06F 5/06; H04L 7/0012
USPC ........................................................ 713/401
See application file for complete search history.

(56) References Cited

U.S. PATENT DOCUMENTS

| | | | |
|---|---|---|---|
| 5,781,049 A | 7/1998 | Fugo | |
| 6,664,802 B2 | 12/2003 | Wimmer et al. | |
| 6,864,722 B2 * | 3/2005 | Adkisson | G06F 1/12 327/12 |
| 7,221,126 B1 * | 5/2007 | Williamson | G06F 1/04 370/503 |
| 7,702,945 B2 | 4/2010 | Shibayama et al. | |
| 7,936,637 B2 | 5/2011 | Shori | |
| 8,103,897 B2 | 1/2012 | Endo et al. | |
| 8,418,092 B2 | 4/2013 | Basto et al. | |
| 8,804,887 B2 | 8/2014 | Uehara | |
| 8,829,957 B1 * | 9/2014 | Fluegel | H04L 7/10 327/146 |
| 9,479,182 B1 * | 10/2016 | Baidas | H03L 7/08 |
| 10,116,315 B1 | 10/2018 | Zhuang et al. | |

(Continued)

FOREIGN PATENT DOCUMENTS

| | | |
|---|---|---|
| CN | 104639118 A | 5/2015 |
| CN | 107733428 A | 2/2018 |

(Continued)

*Primary Examiner* — Volvick Derose
(74) *Attorney, Agent, or Firm* — Seed IP Law Group LLP

(57) ABSTRACT

An integrated circuit includes a first subsystem including a first clock generator configured to generate a first clock signal. The integrated circuit also includes a second subsystem including a second clock generator configured to generate a second clock signal. The first subsystem includes an edge detector configured to detect an edge of the second clock signal. The first clock generator generates the first clock signal with a selected phase relative to the second clock signal based on the edge of the second clock signal.

20 Claims, 5 Drawing Sheets

(56) References Cited

U.S. PATENT DOCUMENTS

| | | |
|---|---|---|
| 10,164,758 B2 | 12/2018 | Yang et al. |
| 2003/0174003 A1 | 9/2003 | Nogami |
| 2004/0170200 A1* | 9/2004 | Radjassamy .......... H04L 7/0008 370/518 |
| 2008/0218225 A1* | 9/2008 | Shibayama ........... H04L 7/0012 327/144 |
| 2009/0174445 A1* | 7/2009 | Kim ....................... G11C 7/22 327/153 |
| 2012/0105113 A1* | 5/2012 | Maeno ................ G06F 13/4217 327/144 |
| 2015/0010122 A1* | 1/2015 | Baek ..................... H04L 7/0008 375/371 |
| 2015/0015314 A1 | 1/2015 | Dally |
| 2016/0314092 A1* | 10/2016 | Suzuki ..................... G06F 1/08 |
| 2017/0285938 A1* | 10/2017 | Lee ...................... G11C 7/1066 |
| 2018/0152279 A1 | 5/2018 | Yang et al. |
| 2019/0044520 A1* | 2/2019 | Tang .......................... G06F 1/12 |
| 2019/0081630 A1* | 3/2019 | Li ............................ H03L 7/00 |
| 2021/0356986 A1* | 11/2021 | Chang ...................... G06F 1/12 |
| 2022/0206987 A1 | 6/2022 | Bal et al. |
| 2023/0259158 A1* | 8/2023 | Bal .......................... G06F 1/12 713/401 |
| 2023/0299757 A1* | 9/2023 | Rashidi ............... H03M 1/0836 341/152 |

FOREIGN PATENT DOCUMENTS

| | | |
|---|---|---|
| CN | 108292923 A | 7/2018 |
| CN | 109217951 A | 1/2019 |
| CN | 110661525 A | 1/2020 |
| CN | 105322956 B | 3/2020 |
| WO | WO 2017142665 A1 | 8/2017 |

* cited by examiner

LOW OVERHEAD MESOCHRONOUS DIGITAL INTERFACE

BACKGROUND

Technical Field

The present disclosure is related to integrated circuits, and more particularly, to communication between subsystems of integrated circuits.

Description of the Related Art

A system on-chip (SoC) includes a plurality of subsystems implemented in a single integrated circuit. In some cases, one subsystem of the SoC is configured to provide data to another subsystem of the SoC. It can be difficult to manage such communication efficiently.

FIG. 1 illustrates an example of an integrated circuit 100. The integrated circuit 100 is an SoC. The integrated circuit 100 includes a first subsystem 102 and a second subsystem 104. The first subsystem 102 is configured to output data to the second subsystem 104. The first subsystem 102 operates on a first clock signal CLK1. The second subsystem 104 operates on a second clock signal CLK2. The first and second clock signals are mesochronous. Mesochronous clock signals have a same frequency and a constant, unknown, phase difference.

There are various complications that affect the timing of communication between the first and second subsystems 102 and 104. For example, there may be certain delays in processing and transmitting data from the first subsystem 102 and certain other delays in processing and receiving data in the second subsystem 104. Additionally, the first and second clock signal have a same frequency and are out of phase with each other to an unknown degree. These factors make it difficult to reliably transmit data from the first subsystem 102 in accordance with the first clock signal CLK1 and to receive data at the second subsystem on a desired cycle of the second clock signal. If this is not managed properly, then there can be delays and even failures in data reception by the second subsystem 104.

One possible solution to ensure safe transmission of data from the first subsystem 102 to the second subsystem 104 is to couple a first-in first-out (FIFO) buffer 106 between the first and second subsystems 102 and 104. The FIFO buffer 106 receives the first clock signal CLK1 from the first subsystem 102 and the second clock signal CLK2 from the second subsystem 104. The FIFO buffer 106 utilizes the first clock signal CLK1 to manage reception of data from the first subsystem 102. The FIFO 106 utilizes the second clock signal CLK2 to manage outputting data to the second subsystem 104.

While this solution ensures safe transmission of data between the first subsystem 102 and the second subsystem 104, there are some drawbacks. For example, the FIFO 106 consumes a relatively large amount of area on the integrated circuit. Furthermore, the FIFO 106 consumes a significant amount of power.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a system on-chip with subsystems that can communicate with each other without intervening circuits, aside from signal lines, conductive plugs, and other passive electrical connectors. This is accomplished by detecting a phase of a clock signal of a receiving subsystem and generating a clock signal for a transmitting subsystem based on the phase of the clock signal of the receiving subsystem. The phase of the transmitting clock signal relative to the receiving clock signal is selected to ensure that the receiving subsystem can properly process data from the transmitting subsystem within a desired cycle of the receiving clock signal.

Embodiments of the present disclosure help ensure that data can be transmitted from the receiving subsystem to the transmitting subsystem without dropping clock cycles at the receiving subsystem. Because the phase of the transmitting subsystem is known and controlled relative to the phase of the receiving clock signal, interfacial circuitry between the transmitting and receiving subsystems, such as a FIFO, can be eliminated. The result is effective and efficient communication between two subsystems with low hardware overhead.

In one embodiment, a method includes generating a first clock signal with a first subsystem of an integrated circuit, receiving the second clock signal with a second subsystem of the integrated circuit; and detecting, with the second subsystem, an edge of the first clock signal. The method includes generating, with the second subsystem, a second clock signal with a phase relative to the second clock signal based on the edge of the first clock signal and outputting data from the second subsystem to the first subsystem based on the second clock signal.

In one embodiment, an integrated circuit includes a receiving subsystem having a receiving clock generator configured to generate a receiving clock signal and data receiving circuitry coupled to the receiving clock generator. The integrated circuit includes a transmitting subsystem having an edge detector configured to detect an edge of the receiving clock signal, a transmission clock generator configured to generate a transmission clock signal with a phase based on the edge of the receiving clock signal, and data transmission circuitry configured to receive the transmission clock signal and to output data to the data receiving circuitry.

In one embodiment, a method includes generating, with a first subsystem of an integrated circuit, a first clock signal and detecting, with a second subsystem, an edge of the first clock signal. The method includes generating, with the second subsystem, a second clock signal having a selected phase relative to the first clock signal by delaying a rising edge of the second clock signal for a selected duration after detecting the edge of the first clock signal.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
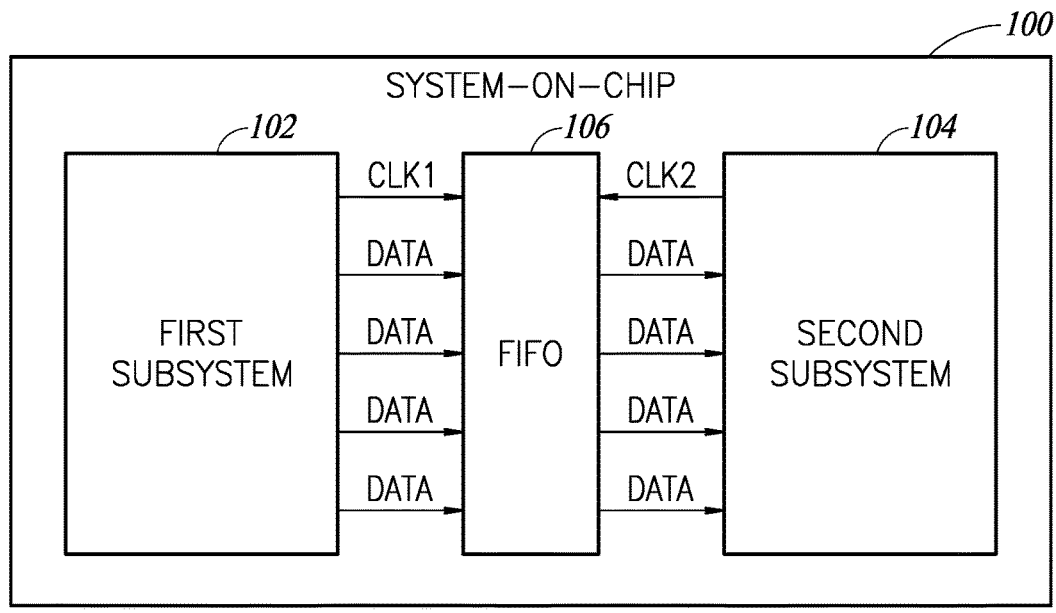
FIG. 1 is a block diagram of an integrated circuit including a first subsystem and a second subsystem.
Figure 2:
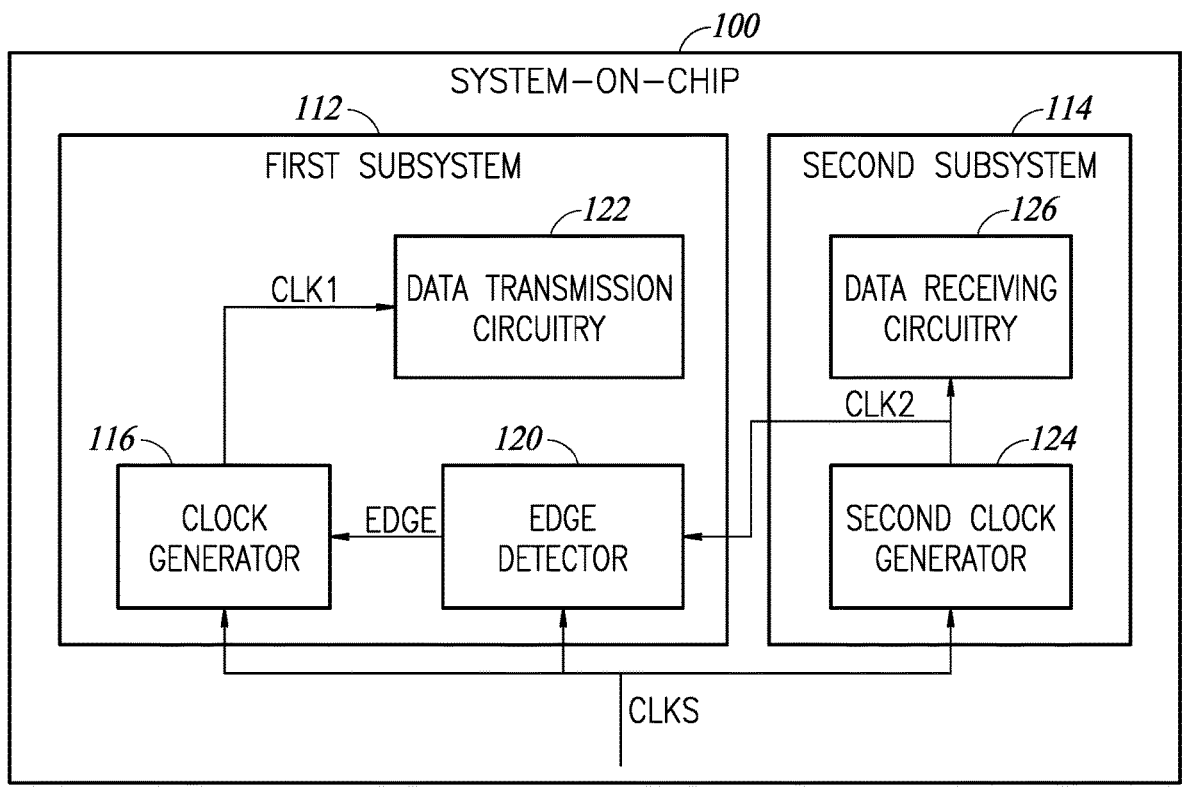
FIG. 2 is a block diagram of an integrated circuit including a first subsystem and a second subsystem, according to one embodiment.

FIG. 2 is a schematic diagram of an integrated circuit 110, according to one embodiment. The integrated circuit 110 includes a first subsystem 112 and a second subsystem 114. The first subsystem 112 transmits data to the second subsystem 114. As will be set forth in more detail below, the first subsystem 112 determines a phase of a receiving clock signal of a second subsystem and generates a transmitting clock signal of the first subsystem 112 with a selected phase relative to the phase of the transmitting clock signal.

The integrated circuit 110 is a system-on-a-chip (SoC). Accordingly, the integrated circuit 110 can include various subsystems such as analog-to-digital converters (ADC), digital-to-analog converters (DAC), microprocessors, memory, memory controllers, bus controllers, digital signal processors, low-voltage differential signaling (LVDS), wireless receivers, wireless transmitters, and other types of subsystems. Some of the subsystems provide data to other subsystems. Embodiments of the present disclosure help ensure that data can be transmitted effectively and efficiently from one subsystem to another. While FIG. 2 illustrates only a first subsystem 112 and a second subsystem 114, in practice, the integrated circuit 110 may include a large number of subsystems such as those described above, or others.

The first subsystem 112 includes a first clock generator 116. The first clock generator 116 generates a first clock signal CLK1. The first clock signal CLK1 can correspond to a transmitting clock signal. The first clock generator 116 receives a global clock signal of the integrated circuit 110. The first clock generator 116 may generate the first clock signal CLK1 based, at least in part, on the global clock signal CLKS.

The first clock generator 116 may include one or more frequency dividers, phase locked loops, or other circuitry that can be utilized to generate the first clock signal CLK1 based on the global clock signal CLKS. Alternatively, or additionally, the first clock generator 116 can include one or more voltage control oscillators, current control oscillators, ring oscillators, or other types of oscillators that can generate a clock signal. The first clock signal CLK1 has a lower frequency than the global clock signal CLKS. For example, the global clock signal CLKS has a frequency at least four times as large as the first clock signal CLK1.

The first clock signal CLK1 may be the clock signal on which the basic functions of the first subsystem 112 are performed. The block diagram of FIG. 2 only illustrates aspects of the first subsystem that are related to transmission of data to the second subsystem 114. In practice, the first subsystem 112 includes other circuitry associated with a primary function of the first subsystem. In an example in which the first subsystem 112 is an ADC, the first subsystem 112 would include circuitry that converts analog signals to digital signals under control of the first clock signal. For simplicity, such circuitry is not shown in FIG. 2. In practice, the clock generator 116 may generate a plurality of clock signals to be utilized by various components of the first subsystem 112 not illustrated herein.

The second subsystem 114 includes a second clock generator 124. The second clock signal CLK2 can correspond to a receiving clock signal. The second clock generator 124 receives the global clock signal of the integrated circuit 110. The first clock generator 124 may generate the second clock signal CLK2 based, at least in part, on the global clock signal CLKS.

The second clock generator 124 may include one or more frequency dividers, phase locked loops, or other circuitry that can be utilized to generate the second clock signal CLK2 based on the global clock signal CLKS. Alternatively, or additionally, the second clock generator 124 can include one or more voltage control oscillators, current control oscillators, ring oscillators, or other types of oscillators that can generate a clock signal. The second clock signal CLK2 has a lower frequency than the global clock signal CLKS. For example, the global clock signal CLKS has a frequency at least four times as large as the second clock signal CLK2.

The second clock signal CLK2 may be the clock signal on which the basic functions of the second subsystem 114 are performed. The block diagram of FIG. 2 only illustrates aspects of the second subsystem that are related to receiving of data from the first subsystem 112. In practice, the second subsystem 114 includes other circuitry associated with a primary function of the second subsystem 114. In practice, the clock generator 124 may generate a plurality of clock signals to be utilized by various components of the second subsystem 114 not illustrated herein.

In one embodiment, the first clock signal CLK1 and the second clock signal CLK2 have the same frequency. However, the first and second clock signals CLK1 and CLK2 are out of phase with each other. Initially, the phase difference between the first clock signal CLK1 and the second clock signal CLK2 may be unknown. Accordingly, the first clock signal CLK1 and the second clock signal CLK2 are mesochronous because they have a same frequency and constant phase difference. The magnitude of the phase difference affects how data is transmitted from the first subsystem 112 and received by the second subsystem 114. If no action is taken based on the phase difference, then it is possible that clock cycles will be wasted between transmitting and receiving data due to delays associated with transmitting and receiving data. Furthermore, data received may be corrupted. As will be set forth in more detail below, the first subsystem 112 detects the phase of the second clock signal CLK2 and adjusts her generates the first clock signal CLK1 with a phase selected based on the phase of the second clock signal CLK2.

The first subsystem includes an edge detector 120. The first subsystem 112 receives the second clock signal CLK2 from the second subsystem 114. The second clock signal CLK2 is provided to the edge detector 120. The edge detector 120 detects an edge of the second clock signal CLK2. In one embodiment, the edge detector 120 detects the first rising edge of the second clock signal CLK2. Alternatively, the edge detector 120 can detect the first falling edge of the second clock signal CLK2, or both the first rising edge and the first falling edge of the second clock signal CLK2.

The edge detector 120 also receives the global clock signal CLKS. The edge detector 120 detects the edge of the second clock signal CLK2 based, in part, on the global clock signal CLKS. The edge detector 120 outputs a signal EDGE indicating that the first edge of the second clock signal CLK2 has been detected. The edge detector 120 passes the signal EDGE to the clock generator 116.

The clock generator 116 receives the signal EDGE from the edge detector 120. The signal EDGE indicates the timing of the first edge of the second clock signal CLK2. The edge of the second clock signal CLK2 indicates the phase of the second clock signal CLK2.

The clock generator 116 generates the first clock signal CLK1 with a selected phase relative to the second clock signal CLK2. The phase of the first clock signal CLK1 relative to the second clock signal CLK2 is selected to ensure that the second subsystem 114 can receive data transmitted from the first subsystem 112 to the second subsystem 114 without losing any clock cycles or corrupting the data.

In one embodiment, the global clock signal CLKS has a much higher frequency than the first and second clock signal CLK1 and CLK2. The clock generator 116 generates the first clock signal CLK1 by dividing the frequency of the global clock signal with a frequency divider. The second clock generator 124 generates the second clock signal CLK2 by dividing the frequency of the global clock signal with a frequency divider having a same division ratio as the frequency divider utilized by the clock generator 116 to generate the clock signal CLK1.

After the clock generator 116 receives the signal EDGE, the clock generator 116 generates the clock signal CLK1 by waiting a selected number of clock cycles of the much higher frequency global clock signal CLKS before generating the rising edge of the first clock signal CLK1. In one example, it is desirable for the first clock signal CLK1 to have a rising edge that occurs half a clock cycle after the rising edge of the second clock signal CLK2. In an example in which the frequency of the global clock cycle CLKS is 8 times higher than the frequency of the first and second clock signals CLK1 and CLK2, the clock generator 116 may be configured to generate the rising edge of the first clock signal CLK1 two cycles of the global clock signal CLKS after receiving the signal EDGE. In this example, the signal EDGE is known to have a delay of two cycles of the global clock signal CLKS relative to the rising edge of the second clock signal CLK2. Accordingly, the rising edge of CLK1 happens four cycles of the global clock signal CLKS after the rising edge of the second clock signal CLK2. This ensures that there will not be a set up failure at the second subsystem 114 when receiving data from the first subsystem 112. Other phase differences and other methods of generating the selected phase difference between the first and second clock signal CLK1 and CLK2 can be utilized without departing from the scope of the present disclosure.

The first subsystem 112 includes data transmission circuitry 122. The data transmission circuitry 122 outputs data to the second subsystem 114. In an example in which the first subsystem is an ADC, the data transmission circuitry 122 receives the digital data converted from analog signals and provides the digital data to the second subsystem 114.

The data transmission circuitry 122 includes a plurality of logic circuits that receive data of the first subsystem 112 and output the data to the second subsystem 114. There is delay associated with the logic circuits of the data transmission circuitry 122.

In one example, the data transmission circuitry 122 includes flip-flops that each include a clock terminal, a data input terminal, and a data output terminal. The data received at the input terminal will typically be provided to the output terminal upon the next rising edge of the clock signal received at the input terminal. However, there is a setup delay associated with the flip-flop. When data arrives at the input terminal of the flip-flop, there is a small setup time for the data to be fully received by the input terminal. If the rising edge of the clock signal occurs after data has arrived at the input terminal, but before the set up time has elapsed, then that data will not be passed to the output terminal of the flip-flop until the next rising edge of the clock signal. Accordingly, the setup time associated with the data input terminal is a source of signal transmission delay. Furthermore, there is an additional delay associated with passing data from the input terminal to the output terminal after the rising edge of the clock signal.

The second subsystem 114 includes data receiving circuitry 126. The data receiving circuitry 126 receives data from the data transmission circuitry 122 of the first subsystem 112. The data receiving circuitry 126 also includes logic circuits that receive and process the data from the data transmission circuitry 122 of the first subsystem 112. There are delays associated with the logic circuits of the data receiving circuitry 126.

In one example, the logic circuits of the data receiving circuitry 126 include a plurality of flip-flops. As described previously in relation to flip-flops of the data transmission circuitry 122, there are delays associated with receiving data at input terminals of the flip-flops of the data receiving circuitry. In particular, the setup delay described previously is also a factor in the flip-flops of the data transmission circuitry 126. If the rising edge of the second clock signal is received at the clock terminal of the flip-flop after data arrives at the input terminal of the flip-flop but before the set up time associated with the data input terminal has elapsed, then the data value will not be passed to the flip-flop until the next rising edge of the clock signal. Accordingly, an entire clock signal can be lost if the clock signals that control the flip-flops of both the data transmission circuitry 122 and the data receiving circuitry 126 are not carefully managed.

Returning to the data transmission circuitry, 122 of the first subsystem 112, data is provided to the data transmission circuitry 122 in accordance with the first clock signal CLK1. Digital data is passed to the data transmission circuitry 122 in accordance with the first clock signal. This means that data will arrive at the input terminals of the flip-flops of the data transmission circuitry 122 in accordance with the rising edge of the first clock signal.

However, the clock signal that is provided to the flip-flops of the data receiving circuitry 126 is the second clock signal CLK2. Thus, data arrives at the input terminals of the flip-flops of the data receiving circuitry 126 based on the rising edge of the first clock signal CLK1, but data is passed from the input terminals of the flip-flops of the data receiving circuitry 126 to the output terminals of the flip-flops based on the second clock signal CLK2. Due to the delays associated with the data transmission circuitry 122 and the data receiving circuitry 126 as described above, if the rising edge of the second clock signal CLK2 occurs too close to the rising edge of the first clock signal CLK1, the data will not be received and processed at the data receiving circuitry 126 within the same cycle of the second clock signal CLK2, assuming that the flip-flops of the data receiving circuitry 122 are managed by the rising edge of the second clock signal.

Advantageously, the first subsystem 112 generates the first clock signal CLK1 with a known phase difference relative to the second clock signal CLK2 as described above. In particular, the edge detector 120 detects the rising edge of the second clock signal CLK2 and generates the signal EDGE. The clock generator 116 receives the signal EDGE and generates the edge of the first clock signal CLK1 with a selected phase difference relative to the second clock signal CLK2 based on the signal EDGE and the known delay between the signal EDGE and the edge of the second clock signal CLK2. The phase difference of the first clock signal CLK1 relative to the second clock signal CLK2 is selected to ensure that there is no set up failure at the data receiving circuitry 126 when data arrives at the input terminals of the data receiving circuitry 126.

Figure 3:
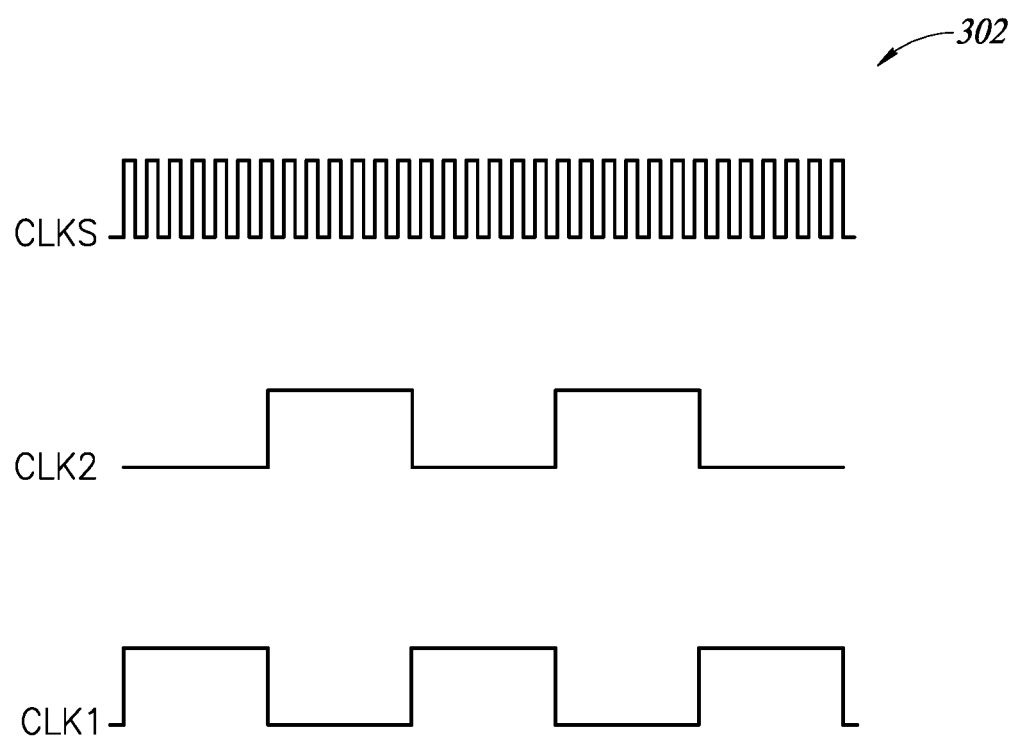
FIG. 3 includes timing diagrams of signals associated with the first and second subsystems of FIG. 2, according to one embodiment.

FIG. 3 is a timing diagram illustrating the global clock signal CLKS, the second clock signal CLK2, and the first clock signal CLK1. In FIG. 3, the first and second clock signal CLK1 and CLK2 have a same frequency. The global clock signal CLKS has a frequency that is much higher than the frequency of the first and second clock signal CLK1 and CLK2.

In one example, the edge detector 120 of the first subsystem 112 receives the second clock signal CLK2 and detects the rising edge of the second clock signal CLK2. The edge detector 120 generates the signal EDGE indicating the timing of the rising edge of the second clock signal CLK2. Due to the inherent delays in the edge detector 120, EDGE may go high one or two cycles of the global clock signal CLKS after the rising edge of the edge detector 120. The clock generator 116 takes into account this known delay associated with the signal EDGE. The clock generator 116 counts an additional number of cycles of the global clock signal CLKS and then generates the rising edge of the first clock signal CLK1. In the example of FIG. 3, the rising edge of the clock signal CLK1 occurs half a clock cycle after the rising edge of the second clock signal CLK2. This may ensure that there are no setup failures at the data receiving circuitry 126 of the second subsystem 114.

In one embodiment, may be beneficial to generate the rising edge of the clock signal CLK1 to occur cycles of the global clock signal CLKS after the rising edge of the second clock signal CLK2. This results in the rising edge of the second clock signal CLK2 occurring nearly a half clock cycle after the rising edge of the first clock signal CLK1. This may provide a very large timing window and may ensure that no setup failures will occur at the data receiving circuitry 126. Various other phase differences can be selected based on known characteristics of first and second subsystems 112 and 114. Furthermore, other components of the methods can be utilized to ensure the selected phase difference between CLK1 and CLK2 in accordance with principles of the present disclosure without departing from the scope of the present disclosure.

Figure 4:
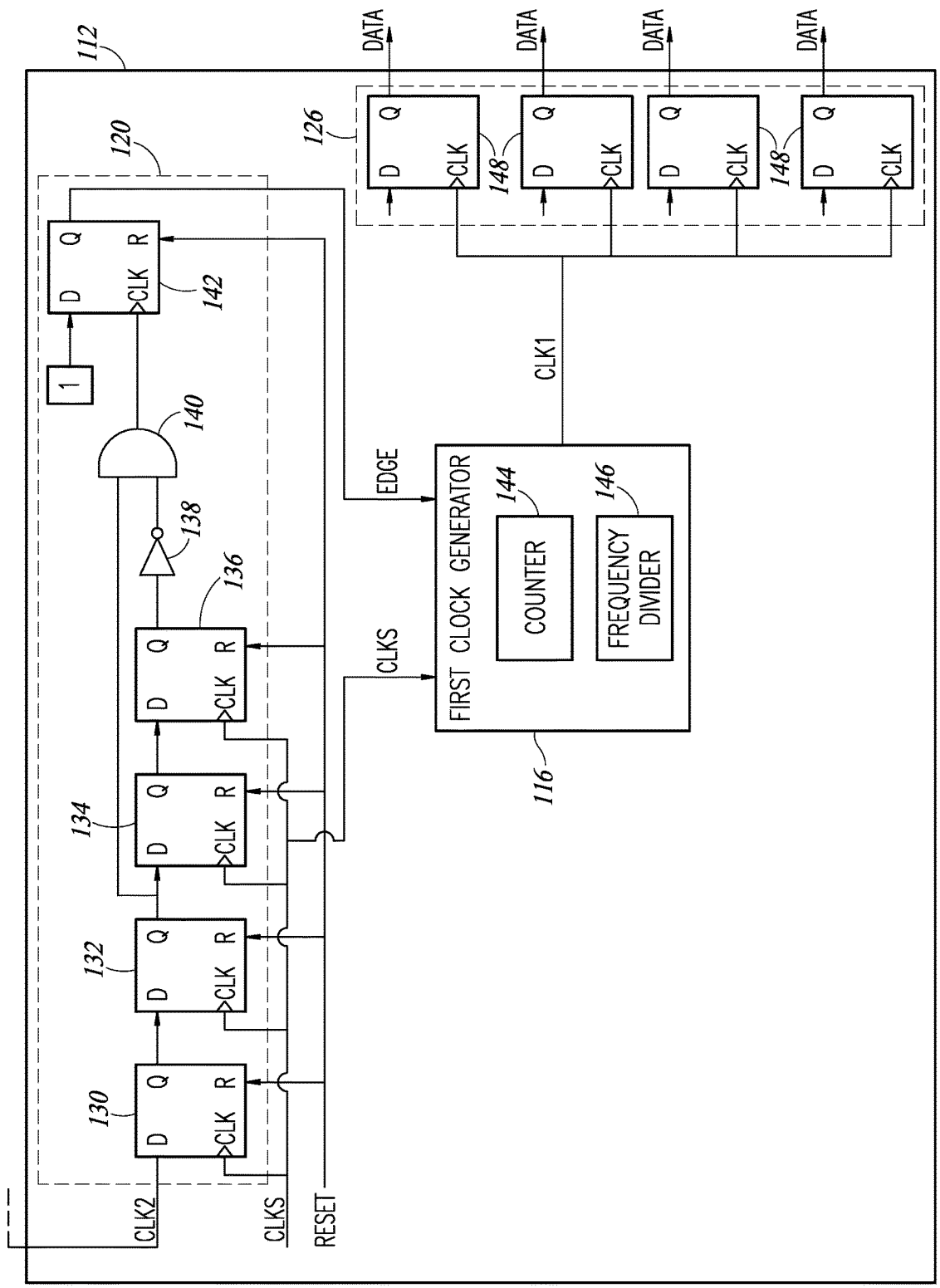
FIG. 4 is a schematic diagram of a first subsystem of an integrated circuit, according to one embodiment.

FIG. 4 is a schematic diagram of a first subsystem 112 of an integrated circuit, according to one embodiment. The first subsystem 112 of FIG. 4 is one example of a first subsystem 112 of FIG. 2. The first subsystem 112 includes the clock generator 116, the edge detector 120, and the data transmission circuitry 122.

The edge detector includes a plurality of flip-flops 130, 132, 134, and 136 all connected in series. In particular, the data output of the flip-flop 130 is connected to the data input of the flip-flop 132. The data output of the flip-flop 132 is connected to the data input of the flip-flop 134. The data output of the flip-flop 134 is connected to the data input of the flip-flop 136. The global clock signal CLKS is provided to the clock input terminals CLK of the flip-flops 130, 132, 134, and 136. The reset terminals R of the flip-flops 130, 132, 134, and 136 each receive a reset signal RESET. The data input terminal of the flip-flop 130 receives the second clock signal CLK2 from the second subsystem 114. The edge detector 120 includes an inverter 138 and an AND gate 140. The input of the inverter 138 is coupled to the output of the flip-flop 136. The output of the inverter 138 is coupled to a first input terminal of the AND gate 140. The output of the flip-flop 132 is provided to a second input terminal of the AND gate 140. The edge detector 120 includes a flip-flop 142. Reset terminal R of the flip-flop 142 receives the reset signal RESET. The clock input terminal CLK of the flip-flop 142 receives the output of the AND gate 140. The data input terminal of the flip-flop 142 receives a high data value of 1. The output of the flip-flop 142 corresponds to the output of the edge detector 120. Accordingly, the output of the flip-flop 142 is the signal EDGE.

When the first subsystem 112 is to generate a first clock signal CLK1 with a selected phase relative to the second clock signal CLK2, the reset signal RESET gets asserted (high to low), causing the data output terminals of the flip-flops 130, 132, 134, 136, and 142 to go low. Reset then gets deasserted (low to high). The data input terminal of the flip-flop 130 receives the second clock signal CLK2. The data input terminal of the flip-flop 130 receives the rising edge of the clock signal CLK2. The rising edge is provided to the data output terminal of the flip-flop 130 at the next rising edge of the much higher frequency global clock signal CLKS. Accordingly, the rising edge of the global clock signal CLK2 is provided to the data input terminal of the flip-flop 132 after the first rising edge of the global clock signal CLKS.

After the second rising edge of the global clock signal CLKS, the rising edge of the clock signal CLK2 is passed to the output of the flip-flop 132. The rising edge of the clock signal CLK2 is also passed to the second input of the AND gate 140. At this point, the output of the inverter 138 is also high because the output of the flip-flop 136 is low upon receiving the reset signal RESET. Accordingly, the output of the AND gate 140 goes high when the rising edge of the second clock signal CLK2 is passed to the output of the flip-flop 132. Because the output of the NAND gate 140 is coupled to the clock input terminal CLK of the flip-flop 142, the output of the flip-flop 142 goes high when the output of the AND gate 140 goes high. Accordingly, the signal EDGE goes high, indicating the presence of the rising edge of the second clock signal CLK2. In this example, there is a delay of two or three cycles of the global clock signal CLKS between the rising edge of CLK2 and the rising edge of EDGE.

The clock generator 116 receives the global clock signal CLKS and the edge signal EDGE. The clock generator 116 includes a counter 144 and the clock divider 146. The counter 144 counts the cycles of the global clock signal CLKS. After the signal EDGE goes high, the clock generator 116 delays a selected number of cycles of the global clock signal CLKS before causing the rising edge of the first clock signal CLK1. The number of cycles can be selected to ensure a desired phase difference between the first clock signal CLK1 and the second clock signal CLK2. The clock generator 116 can take into account the known delay associated with the edge detector 120. As described previously, the clock generator 116 may include a clock divider 146. The clock divider 146 generates the clock signal CLK1 by dividing the frequency of the global clock signal CLKS.

The data transmission circuitry 122 includes a plurality of flip-flops 148. The flip-flops each include a data input terminal D, a data output terminal Q, and a clock input terminal CLK. The data input terminal D receives data from primary circuitry (not shown) of the subsystem 112. In an example in which the subsystem 112 is an analog-to-digital converter, the data input terminals D receive data from the analog-to-digital conversion circuitry.

The clock input terminal CLK of each flip-flop receives the first clock signal CLK1. For each flip-flop 148, whatever data value is present at D will be provided to the output terminal Q when CLK1 goes high, subject to set up delays as described previously. The data output terminals Q are connected to the data input terminals of flip-flops of the data receiving circuitry 126 of the second subsystem 114. The clock input terminals of the flip-flops of the data receiving circuitry 126 each receive the second clock signal CLK2. Because CLK1 is generated with a selected phase difference relative to the clock signal CLK2, there is sufficient time between the rising edge of the first clock signal CLK1 and the rising edge of the second clock signal CLK2 to ensure that there are no setup errors at the flip-flops of the data receiving circuitry 126 of the second subsystem 114.

FIG. 4 is a schematic diagram of a first subsystem 112, according to one embodiment. The first subsystem 112 of FIG. 4 is substantially similar to the first subsystem 112 of FIG. 3, except that the subsystem 112 of FIG. 4 includes flip-flops 140. The flip-flops 140 may be called shadow flip-flops. The data input terminal D of each flip-flop 140 receives data from a data output terminal Q of a corresponding flip-flop 148. The flip-flops 140 each receive the second clock signal CLK2 on the clock input terminal CLK.

Figure 5:
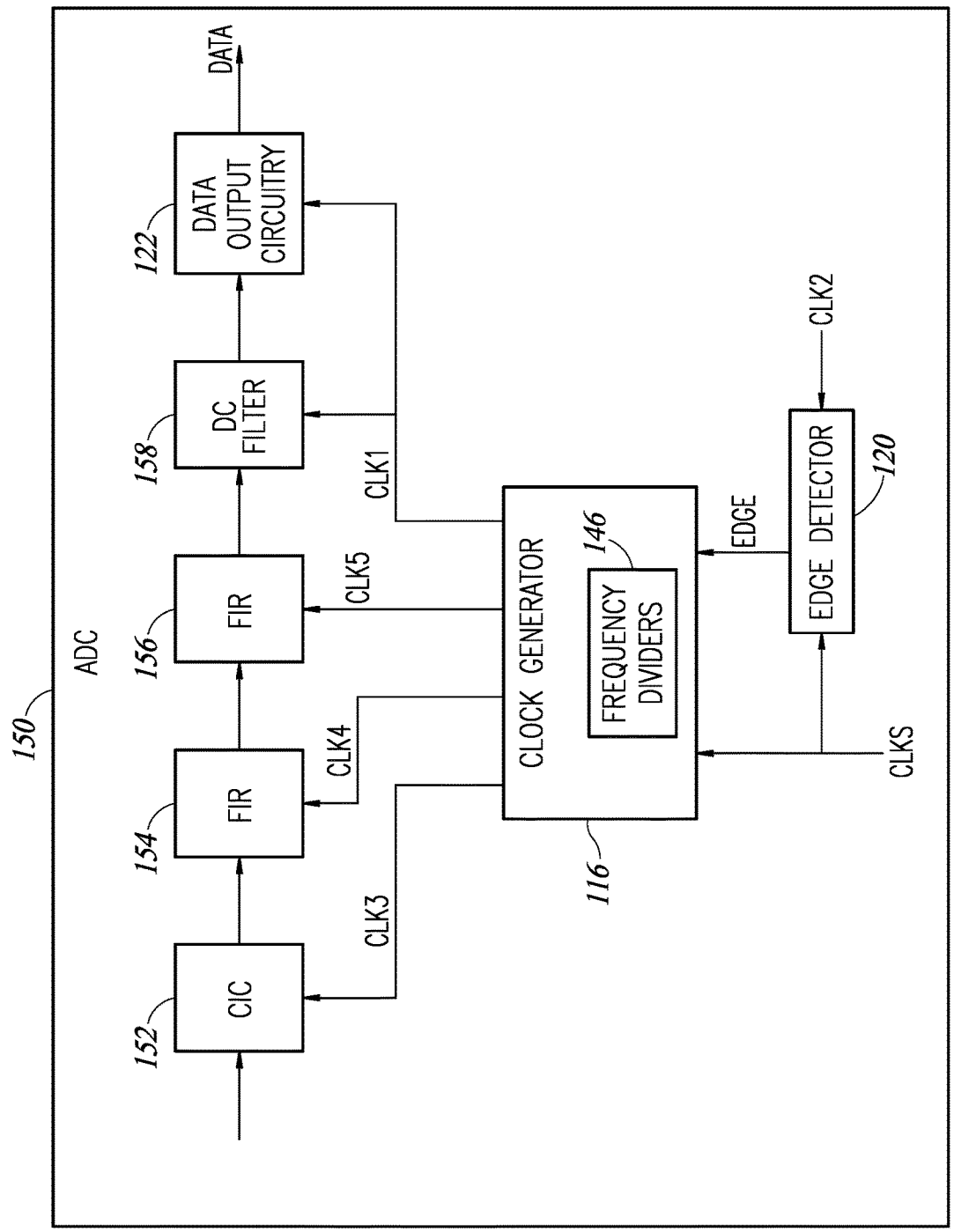
FIG. 5 is a schematic diagram of an analog-to-digital converter of an integrated circuit, according to one embodiment.

FIG. 5 is a schematic diagram of an ADC 150, in accordance with some embodiments. The ADC 150 may be one example of a first subsystem 112 of FIG. 2. The ADC 150 includes an edge detector 120 and a clock generator 116. The edge detector 120 and the clock generator 116 may function substantially as described in relation to FIGS. 2-4. The clock generator 116 includes multiple frequency dividers 146. Accordingly, the clock generator 116 generates a plurality of clock signals each having different frequencies.

The ADC 150 includes a CIC Filter (CIC) 152, a finite impulse response (FIR) filter 154, a FIR filter 156, a DC filter 158, and data output circuitry 122. The signal path of the ADC flows from the CIC 152 to the FIR filter 154, to the FIR filter 156, the DC filter 158, to the data output circuitry 122.

The clock generator generates the first clock signal CLK1 as described previously and provides the first clock signal CLK1 to the DC filter 158 and to the data output circuitry 122. The clock generator 116 generates the clock signal CLK three and provides the clock signal CLK three to the (CIC) 152. The clock signal CLK three may have the same frequency as the global clock signal CLKS. The clock generator 116 generates the clock signal CLK4 and provides the clock signal CLK4 to the FIR filter 154. The clock signal CLK four may have a lower frequency than the clock signal CLK three. The clock generator 116 generates the clock signal CLK5 and provides the clock signal CLK5 to the FIR filter 156. The clock signal CLK five may have a lower frequency than the clock signal CLK4 and the higher for the clock signal CLK1. Accordingly, the clock generator 116 can generate a plurality of clock signals to provide to various components of the ADC 150. Other configurations of an ADC can be utilized without departing from the scope of the present disclosure.

Figure 6:
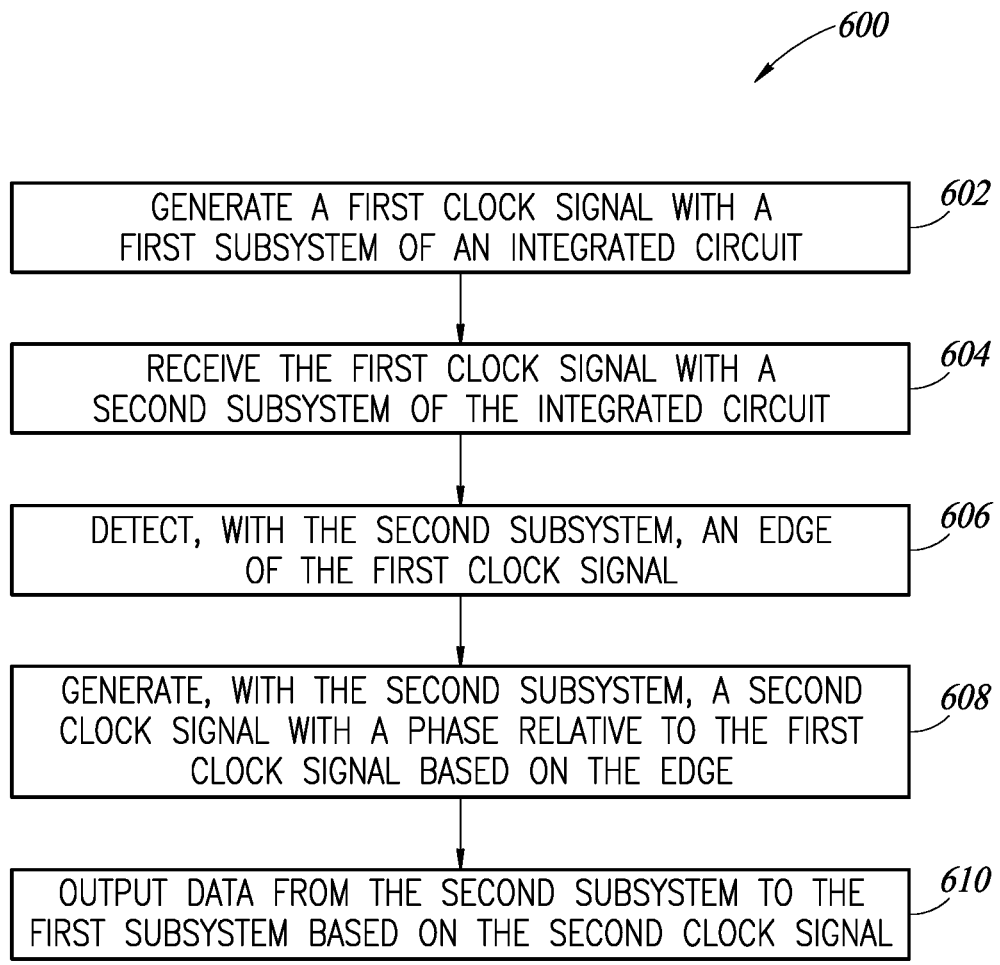
FIG. 6 is a flow diagram of a method of operating an integrated circuit, according to one embodiment.

FIG. 6 is a flow diagram of a method 600, according to one embodiment. The method 600 can utilize systems, components, and processes described in relation to FIGS. 1-5. At 602, the method 600 includes generating a first clock signal with a first subsystem of an integrated circuit. At 604, the method 600 includes receiving the first clock signal with a second subsystem of the integrated circuit. At 606, the method 600 includes detecting, with the second subsystem, an edge of the first clock signal. At 608, the method 600 includes generating, with the second subsystem, a second clock signal with a phase relative to the second clock signal based on the edge. At 610, the method 600 includes outputting data from the second subsystem to the first subsystem based on the second clock signal.

In one embodiment, a method includes generating a first clock signal with a first subsystem of an integrated circuit, receiving the first clock signal with a second subsystem of the integrated circuit; and detecting, with the second subsystem, an edge of the first clock signal. The method includes generating, with the second subsystem, a second clock signal with a phase relative to the second clock signal based on the edge of the first clock signal and outputting data from the second subsystem to the first subsystem based on the second clock signal.

In one embodiment, an integrated circuit includes a receiving subsystem having a receiving clock generator configured to generate a receiving clock signal and data receiving circuitry coupled to the receiving clock generator. The integrated circuit includes a transmitting subsystem having an edge detector configured to detect an edge of the receiving clock signal, a transmission clock generator configured to generate a transmission clock signal with a phase based on the edge of the receiving clock signal, and data transmission circuitry configured to receive the transmission clock signal and to output data to the data receiving circuitry.

In one embodiment, a method includes generating, with a first subsystem of an integrated circuit, a first clock signal and detecting, with a second subsystem, an edge of the first clock signal. The method includes generating, with the second subsystem, a second clock signal having a selected phase relative to the first clock signal by delaying a rising edge of the second clock signal for a selected duration after detecting the edge of the first clock signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a first clock signal with a first subsystem of an integrated circuit, the first subsystem including:
a first plurality of flip-flops coupled in series;
a first logic gate coupled to a data output of a last flip-flop in the series of the first plurality of flip-flops; and
a second flip-flop distinct from the first plurality of flip-flops having a clock input terminal coupled to the first logic gate;
receiving the first clock signal with a second subsystem of the integrated circuit;
detecting, with the second subsystem, an edge of the first clock signal;
generating, with the second subsystem, a second clock signal with a phase relative to the second clock signal based on the edge of the first clock signal; and
outputting data from the second subsystem to the first subsystem based on the second clock signal.

2. The method of claim 1, wherein generating the second clock signal includes delaying a rising edge of the second clock signal for a selected duration after detecting the edge of the first clock signal.

3. The method of claim 1, comprising:
receiving a global clock signal with the first subsystem and the second subsystem;
generating the first clock signal based on the global clock signal;
delaying the rising edge of the second clock signal for a selected number of cycles of the global clock signal after detecting the edge of the first clock signal.

4. The method of claim 3, comprising:
generating the first clock signal by dividing the frequency of the global clock signal; and
generating the second clock signal by dividing the frequency of the global clock signal.

5. The method of claim 4, wherein the first and second clock signals have a same frequency.

6. The method of claim 1, comprising:
outputting the data from the data transmission circuitry of the second subsystem; and
providing the second clock signal to the data transmission circuitry of the second subsystem.

7. The method of claim 6, comprising:
receiving the data from the data transmission circuitry of the second subsystem with data receiving circuitry of the first subsystem; and
providing the first clock signal to the data receiving circuitry.

8. The method of claim 7, comprising:
providing the first clock signal to clock input terminals of a second plurality of flip-flops of the data receiving circuitry; and
providing the second clock signal to clock input terminals of a third plurality of flip-flops of the data transmission circuitry.

9. The method of claim 1, wherein the second subsystem is an analog-to-digital converter.

10. An integrated circuit, comprising:
a receiving subsystem including:
a receiving clock generator configured to generate a receiving clock signal; and
data receiving circuitry coupled to the receiving clock generator;
a transmitting subsystem including:
an edge detector configured to detect an edge of the receiving clock signal, the edge detector including:
a first plurality of flip-flops coupled in a series;
an AND gate coupled to a data output of a last flip-flop in the series; and
an inverter coupled between the last flip-flop in the series and the AND gate;
a transmission clock generator configured to generate a transmission clock signal with a phase based on the edge of the receiving clock signal; and
data transmission circuitry configured to receive the transmission clock signal and to output data to the data receiving circuitry.

11. The integrated circuit of claim 10, wherein the transmission clock generator includes a counter configured to count cycles of a global clock signal.

12. The integrated circuit of claim 11, wherein the counter is configured to generate the transmission clock signal by outputting a rising edge of the transmission clock signal a selected number of cycles of the global clock signal after the edge of the receiving clock signal.

13. The integrated circuit of claim 12, wherein the transmission clock generator includes frequency divider and is configured to divide a frequency of the global clock signal to generate the transmission clock signal.

14. The integrated circuit of claim 10, wherein the data transmission circuitry includes a second plurality of flip-flops configured to receive the transmission clock signal.

15. The integrated circuit of claim 14, wherein the data receiving circuitry includes a third plurality of flip-flops coupled to the second plurality of flip-flops and configured to receive the receiving clock signal.

16. The integrated circuit of claim 10, wherein a first flip-flop of the first plurality of flip-flops in the edge detector receives the receiving clock signal on a data input terminal.

17. The integrated circuit of claim 16, wherein the first plurality of flip-flops each receive a global clock signal.

18. A method, comprising:
generating, with a first subsystem of an integrated circuit, a first clock signal, the first subsystem including an AND gate with a first output coupled to a clock input terminal of a first flip-flop;
detecting, with a second subsystem, an edge of the first clock signal; and
generating, with the second subsystem, a second clock signal having a selected phase relative to the first clock signal by delaying a rising edge of the second clock signal for a selected duration after detecting the edge of the first clock signal.

19. The method of claim 18, comprising:

counting cycles of a global clock signal with the second subsystem; and delaying the rising edge of the second clock signal for a selected number of cycles of the global clock signal after detecting the edge of the first clock signal.

20. The method of claim 19, comprising generating the second clock signal by dividing a frequency of the global clock signal.

\* \* \* \* \*